US008086080B2

(12) United States Patent
Wagener et al.

(10) Patent No.: US 8,086,080 B2
(45) Date of Patent: *Dec. 27, 2011

(54) MULTIPLE FUNCTION DIGITAL OPTICAL SWITCH

(75) Inventors: Jefferson L. Wagener, New Hope, PA (US); Thomas Andrew Strasser, Warren, NJ (US)

(73) Assignee: Nistica, Inc., Bridgewater, NJ (US)

( * ) Notice: Subject to any disclaimer, the term of this patent is extended or adjusted under 35 U.S.C. 154(b) by 400 days.

This patent is subject to a terminal disclaimer.

(21) Appl. No.: 11/781,931

(22) Filed: Jul. 23, 2007

(65) Prior Publication Data

US 2009/0028501 A1    Jan. 29, 2009

(51) Int. Cl.
*G02B 6/26* (2006.01)
(52) U.S. Cl. .............................. 385/18; 385/15; 385/16
(58) Field of Classification Search .................... 385/15, 385/16, 18
See application file for complete search history.

(56) References Cited

U.S. PATENT DOCUMENTS

| | | | |
|---|---|---|---|
| 6,115,172 A * | 9/2000 | Jeong | 359/292 |
| 6,295,154 B1 | 9/2001 | Laor et al. | 359/223 |
| 6,549,699 B2 | 4/2003 | Belser et al. | |
| 6,618,520 B2 | 9/2003 | Tew | |
| 6,625,346 B2 | 9/2003 | Wilde | |
| 6,661,948 B2 | 12/2003 | Wilde | |
| 6,687,431 B2 | 2/2004 | Chen et al. | |
| 6,712,473 B2 * | 3/2004 | Kurematsu | 353/99 |
| 6,816,640 B2 | 11/2004 | Tew | |
| 6,819,468 B2 | 11/2004 | Dho | |
| 6,842,549 B2 * | 1/2005 | So | 385/15 |
| 7,072,539 B2 | 7/2006 | Wu et al. | |
| 7,171,068 B2 | 1/2007 | Bartlett et al. | |
| 7,203,398 B2 | 4/2007 | Koontz et al. | |
| 7,324,755 B2 | 1/2008 | Izadpanah | |
| 7,813,601 B2 | 10/2010 | Powell | |
| 2002/0034356 A1 | 3/2002 | Tew | |
| 2003/0164959 A1 | 9/2003 | Towery | 358/1.8 |
| 2004/0120049 A1 | 6/2004 | Bartlett et al. | |
| 2004/0196358 A1 | 10/2004 | Murokh et al. | 347/255 |

FOREIGN PATENT DOCUMENTS

KR    1020030097329    12/2003

\* cited by examiner

*Primary Examiner* — Jennifer Doan
(74) *Attorney, Agent, or Firm* — Stuart H. Mayer; Mayer & Williams P.C.

(57) ABSTRACT

A multiwavelength switch is provided. The switch includes at least one optical input for receiving an optical beam and at least two optical outputs. A dispersion element receives the optical beam from the optical input and spatially separates the optical beam into a plurality of wavelength components. A collimating element is provided for collimating the plurality of wavelength components. An actuatable optical arrangement receives the collimated plurality of wavelength components from the collimating element. The actuatable optical arrangement includes a digital micromirror device (DMD) from which at least one wavelength component is reflected at least twice before being directed to a selected one of optical outputs.

22 Claims, 6 Drawing Sheets

MULTIPLE FUNCTION DIGITAL OPTICAL SWITCH

STATEMENT OF RELATED APPLICATION

This application is related to U.S. patent application Ser. No. 11/781,940, entitled "High Resolution Digital Optical Encoder/Decoder", filed on even date herewith, which is incorporated herein by reference in its entirety.

BACKGROUND

As the quantity and speed of data communications over fiber optic systems rapidly increases due to the growing demand from Internet usage and other communications, improved all-optical switching systems are of increased interest to overcome the high cost and slow switching speeds of conventional switches. These conventional switches include, for example, various mechanical switches, electro-optic switches, and thermo-optic switches. In particular, the increased complexity and cost of switching systems that involve switching from an optical signal to an electrical signal and then back to an optical signal have increased the level of interest in improved all-optical switches.

An all-optical switch provides switching of an optical signal from one input path to a selected one of a plurality of different output paths without any intermediate conversion of the optical signal to an electrical signal. This is typically accomplished by applying an electrical signal to a switchable element to cause the optical signal to be selectively switched. These electro-optic switches are responsive to the electrical signal to selectively switch the light of the optical signal from the input path to the selected one of the output paths.

A variety of approaches are known for making all-optical optical switches, such as, for example, described in U.S. Pat. Nos. 6,687,431, 6,661,948, 6,625,346, and 6,549,699. The switchable element in many of these devices is a Micro-Electromechanical System (MEMS) optical element such as a MEMS mirror. The MEMS mirrors may be individually controllable and movable, e.g., pivotable (or rotatable) under analog (or continuous) control, such that, upon reflection, optical wavelengths are directed from one or more input ports into selected ones of the output ports. In this way, the optical switch may be used to selectively couple the wavelengths between the input and output ports of the system. However, a number of problems arise when such MEMS mirrors operating in an analog manner are used in an optical switch. For example, to avoid instability from mirror structure resonance a means for sensing the precise position of each MEMS mirror may need to be integrated with the MEMS device, which can be difficult and complex to achieve. In addition, switching individual MEMS elements into a MEMS device can cause disturbances in neighboring MEMS elements. In particular, switching MEMS mirrors in a MEMS array has been found to cause an aerodynamic coupling with other mirrors in the array that can disturb mirrors that are intended to remain static. The position of the MEMS mirrors can also drift because the mirrors are generally actuated by a relatively weak electrostatic force that requires a large voltage. The large voltage can cause charging that also disturbs the position of the mirrors. All of these effects become a more significant problem when these devices perform dynamic gain equalization by off-axis alignment of the free space beam as it is coupled into an output port. This technique requires in a much tighter tolerance in the mirror positioning because the attenuation sensitivity as a function of angular positioning level increases nonlinearly as off-axis alignment is extended to achieve higher attenuation levels. The higher sensitivity is the reason complex servo-loops and expensive mirror position sensing systems are disclosed as desirable for this technology.

Digital mirror arrays solve many of the problems with their analog counterparts, and a number of such arrays have become available which include an integrated monolithic switching structure. These devices use relatively low voltages to provide individual mirror elements that can be selectively switched between two or more positions with high precision and stability. One class of such digital mirror arrays are spatial light modulators, often referred to as digital micromirror displays or devices (DMDs). Typically, a DMD consists of an array of tiny mirrors (typically, several million per square inch), wherein the angular position of each mirror element is individually controllable between at least two positions that are angularly offset from one another by approximately 10 to 20 degrees, for instance. A mirror base is located behind the mirror elements. The individually addressable mirror elements are tiltably mounted on mechanical hinges, and typically the array of mirror elements overlays a layer of controlling circuitry in the mirror base, all of which is mounted on a semiconductor chip. The mirror face of the DMD is composed of a generally rectangular grid array of rectangular or square mirror elements. A typical mirror element is about 16 micrometers square, and the individual elements are separated from one another by a distance of about 1 micron. Individually controlled tilting of the mirror elements in the array around at least one axis allows energy that is reflected from the mirror face to be formed into a predetermined pattern. Further, the mirror face can be substantially instantaneously reconfigured in response to digital signals to form a different pattern. Such reconfiguration can generally be achieved in about 25 microseconds or less.

Optical switches incorporating DMDs are known and disclosed, for example, in U.S. Pat. Nos. 6,295,154, and 7,203, 398 and U.S. Appl. Serial Nos. 2003/0164959 and 2002/0034356. These switches suffer from a number of limitations in extending the devices to higher levels of functionality to support multiple wavelengths or colors or light on each port, larger numbers of switching ports, or additional functionality such as independent control of the optical power level during switching Accordingly, it would be advantageous to provide a multiple function DMD switching device that is capable of performing multiple optical processing functions In particular, it would be advantageous to provide a device that integrates a 1×N switch (where N>1) that can control the power levels directed to multiple output ports in a cross-talk free manner.

SUMMARY

In accordance with one embodiment of the invention, a multiwavelength switch is provided. The switch includes at least one optical input for receiving an optical beam and at least two optical outputs. A dispersion element receives the optical beam from the optical input and spatially separates the optical beam into a plurality of wavelength components. A collimating element is provided for collimating the plurality of wavelength components. An actuatable optical arrangement receives the collimated plurality of wavelength components from the collimating element. The actuatable optical arrangement includes a digital micromirror device (DMD) from which at least one wavelength component is reflected at least twice before being directed to a selected one of optical outputs.

DETAILED DESCRIPTION

As detailed below, a wavelength selective switch that employs a DMD is provided. In contrast to the switches described above, the wavelength selective switch described herein includes a dispersive element to separate the different wavelengths of a wavelength division multiplexed (WDM) or dense wavelength division multiplexed (DWDM) signal, thereby enabling the switching of multiple wavelengths from each port. In addition, the switch can perform other functions in addition to or as an alternative to optical switching. For example, unlike the aforementioned switches, when the switch described herein is configured as a 1×N switch with N>1, it can simultaneously perform dynamic gain equalization or power control on a per wavelength basis without undesirable inter-port crosstalk.

It should be noted at the outset that the wavelength selective switch described below operates in a symmetric manner so that any wavelength components directed to any of the output ports can be alternatively directed to any of the input ports. Accordingly, one of ordinary skill in the art will recognize that the switching paths are reciprocal, and thus the terms input and output as used herein are not limited to elements that transmit an optical signal or wavelength component in a single direction relative to the switch. In other words, when light enters the device from any so-called output port, this output port serves as an input port, and similarly, any so-called input port can equally serve as an output port.

Figure 1:
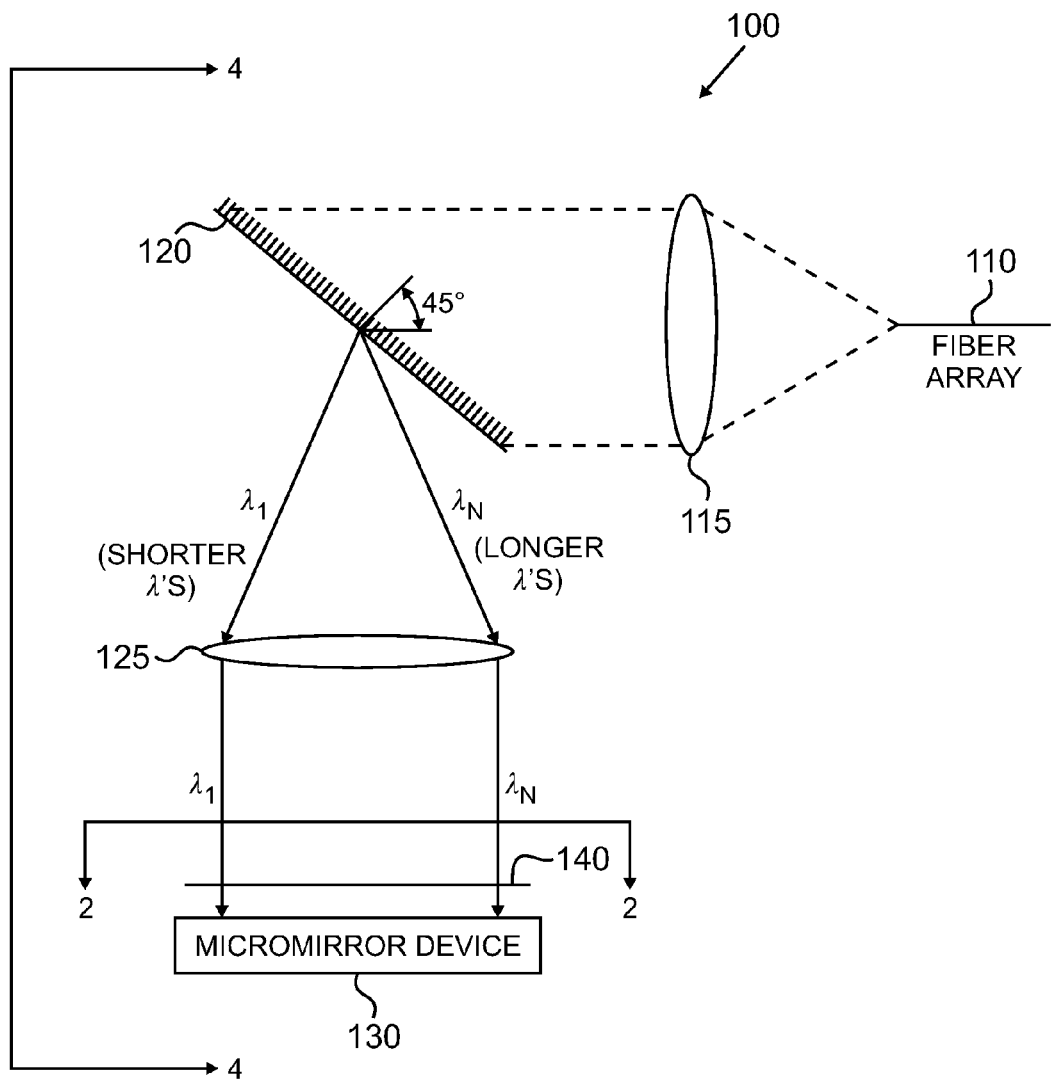
FIG. 1 shows a first side view of one embodiment of a wavelength selective switch constructed in accordance with the present invention.

FIG. 1 shows a first side view of one embodiment of a wavelength selective switch 100 constructed in accordance with the present invention. While the switch may be employed in connection with any optical wavelengths, it is particularly suitable for use in connection with optical wavelengths in the C-band (wavelengths between about 1525 to 1565 nm) or the L-band (wavelengths between about 1565-1625 nm). The switch includes an array 110 of parallel input/output optical ports (e.g., fibers) in the plane coming out of the page, only one of which is visible in FIG. 1. A collimating lens 115 is positioned to receive light exiting from the fiber array 110. The collimating lens 115 is centered about the optical axis extending from the middle fiber in fiber array 110. In this way light exiting the fibers in the fiber array 110 is collimated by lens 115. The collimated light is then incident upon a transmission grating 120, which spatially separates the light into its component wavelengths $\lambda_1, \lambda_2, \lambda_3, \ldots \lambda_N$ and directs them through a second lens 125. Lens 125 performs different functions in the two axes of the lens plane. In the plane of the page in FIG. 1, the lens collimates the dispersed wavelengths $\lambda_1$ through $\lambda_N$. In the plane out of the page the lens focuses the collimated beam onto the surface of the micromirror device 130. The result is a stripe of spatially separated wavelengths that are collimated along the axis of dispersion, and focused perpendicular to that axis, where the stripe is directed between mirror strips 140 (only one of which is visible in FIG. 1) and onto the surface of a micromirror device 130.

Figure 2:
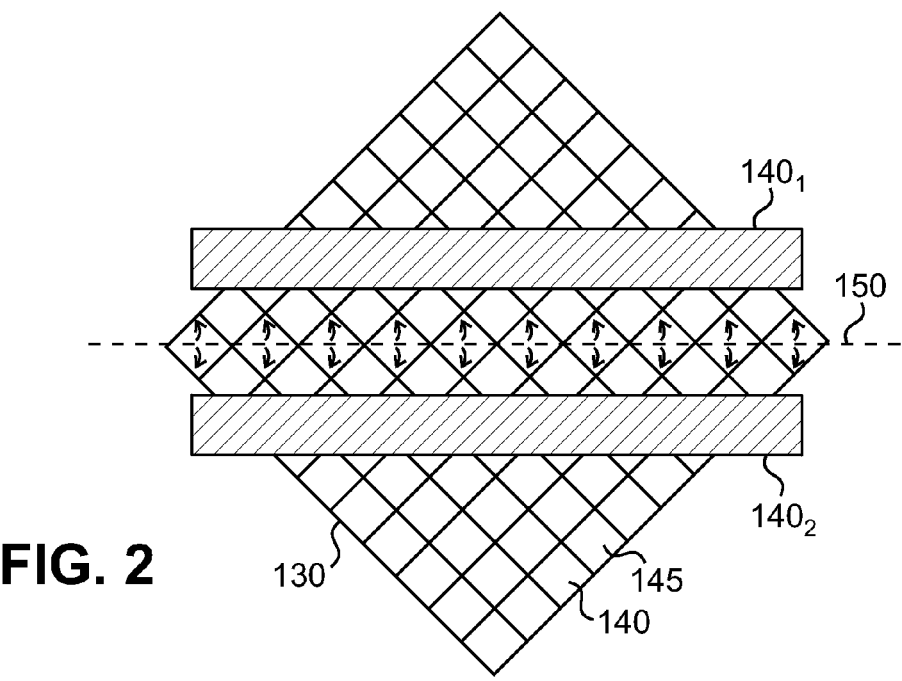
FIG. 2 shows a plan view of the surface of the micromirror device on which the wavelengths are incident, taken along line 2-2 in FIG. 1.

FIG. 2 shows a plan view of the surface of the micromirror device 130 on which the wavelengths are incident, taken along line 2-2 in FIG. 1. The mirror face of micromirror device 130 is populated with thousands of miniature, tiltable, individually controllable mirror elements, typical ones of which are indicated at 140 and 145. Each mirror element typically has dimensions on the order of microns. For example, one particular such micromirror device 130 is a 768×1024 array of individually controllable mirror elements. Each mirror element is a square about 16 microns on each side and rotates about an axis parallel to the plane of the device 130. As indicated in FIG. 2 by dashed line 150, the axis of the mirror elements extends diagonally from one corner to the opposite corner of each mirror element.

Mirror strips $140_1$ and $140_2$ ("mirror strips 140") are situated over the surface of the micromirror device 130 and extend in a direction parallel to the axis 150. The mirror strips 140 can be fabricated directly on the lower surface of a transparent window or substrate using conventional lithographic or other techniques. The substrate can be integrated with the micromirror device 130 to form a single optical assembly. An anti-reflective coating may be applied to the upper surface of the window to reduce back reflections. Likewise, an anti-reflective coating may be applied to the nonreflective portions of the lower surface between the individual mirror strips.

Figure 3:
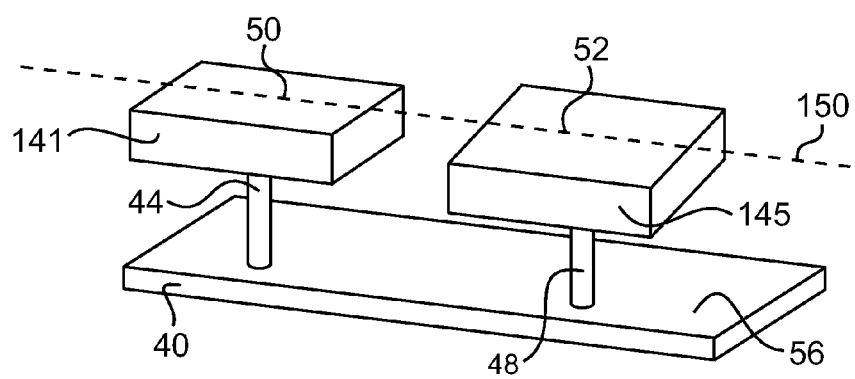
FIG. 3 is a perspective view of two mirror elements, which are tiltably mounted so that they can tilt about axis.

FIG. 3 is a perspective view of mirror elements 141 and 145, which are tiltably mounted so that they can tilt about axis 150. The unactuated surface 50 of individual mirror element 141, and the surface 52 of individual mirror element 145 normally lie in the same plane, which can be referred to as the off or float state of the mirror elements. By the application of a controlling force to effect the movement of, for example, support member 48, surface 52 can be tilted around axis 150 out of the common plane. If support 44 holds element 141 in its original position (i.e. its float state), light incident on surface 50 will be reflected to a different location than light incident on surface 52. Micromirror devices are well known, commercially available components and thus details concerning their structure and fabrication need not be discussed further.

Micromirror devices such as micromirror device 130 are generally operated in one of two modes of operation. The first mode of operation is an analog mode, sometimes called beam steering. In this mode of operation the address electrodes, which control the rotation of the individual mirror elements about their respective axes, is charged to a voltage corresponding to the desired deflection of the mirror. Light striking the micromirror device is reflected by the mirror at an angle determined by the deflection of the mirror. The second mode of operation is a digital mode. When operated digitally, each mirror element is fully deflected in either of the two directions about its axis. That is, each mirror element can be positioned in one of three states: two states in which the mirror element are tilted in opposite directions from one another and the off or flat state. Digital operation uses a relatively large voltage to ensure the mirror is fully deflected. For purposes of illustration the present invention will be described in terms of a micromirror device that operates in a digital mode. Such a micromirror device may be conveniently referred to as a digital micromirror device (DMD). In some embodiments of the invention the DMD is preferably selected to have mirror elements sufficiently small so that each wavelength component can reflect off of a relatively large number mirror elements (e.g., 10 or more). Additionally, in some embodiments the spatial fill factor of the mirror elements relative to total area of the mirror array in the DMD is equal to about 85% or more.

Figure 4:
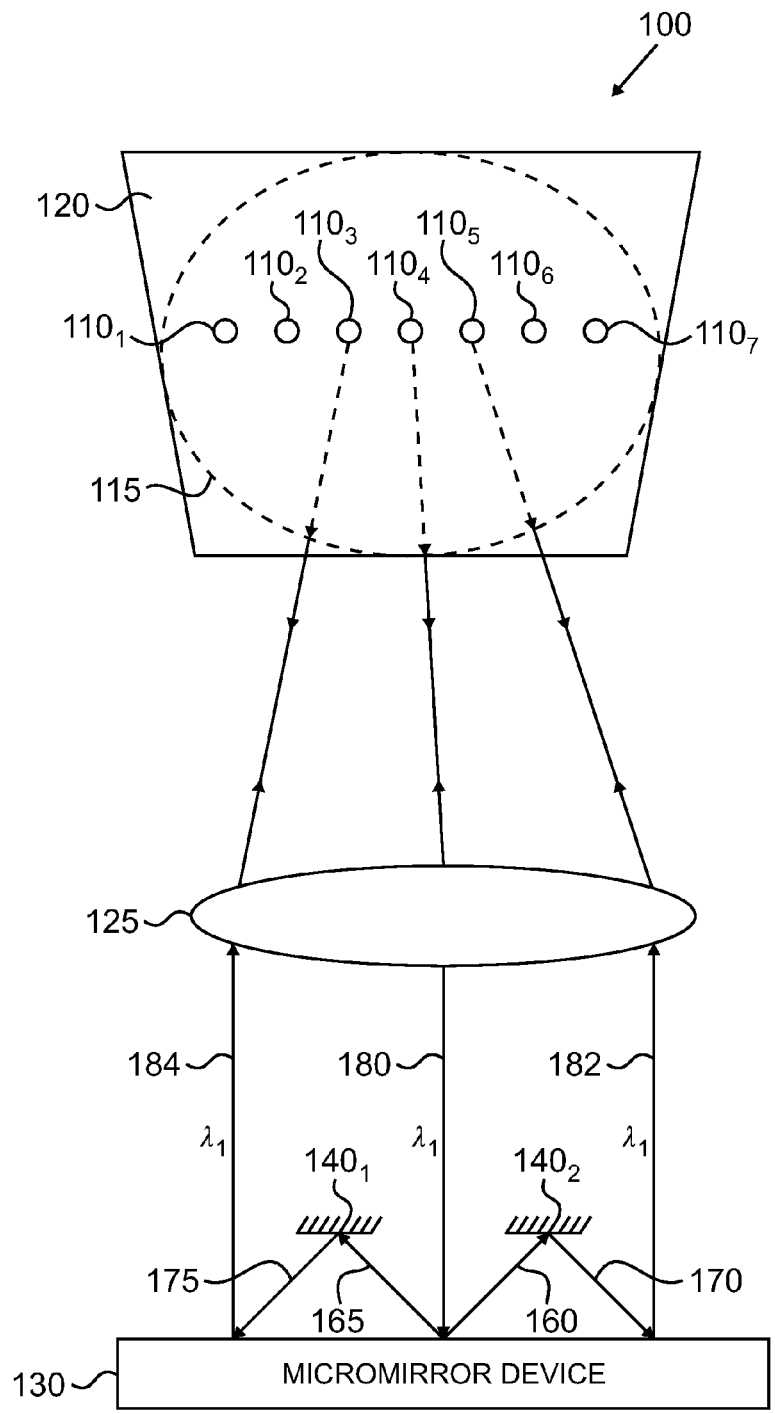
FIG. 4 is a second side view of the wavelength selective switch taken along line 4-4 in FIG. 1.

FIG. 4 is a second side view of the wavelength selective switch taken along line 4-4 in FIG. 1. This view illustrates the manner in which wavelength $\lambda_1$ is selectively switched from an input fiber (i.e., fiber $110_4$) in fiber array 110 to one of two output fibers $110_3$ and $110_5$ in fiber array 110. The remaining wavelengths $\lambda_2$-$\lambda_N$ are selectively switchable in a similar manner.

The dimensions of the mirror elements in DMD 130 are sufficiently small relative to the optical wavelengths that are employed in the switch 100 so that the light is diffracted off the DMD 130. Accordingly, depending on the tilt angle of the mirror elements upon which wavelength $\lambda_1$ is incident, the DMD 130 serves as a blazed grating and the light will be diffracted up and to the right along path 160 or, alternatively, up and the left along path 165. The diffracted light will reinforce itself as it reflects back toward mirror strips $140_1$ or $140_2$, forming a series of points of light at locations represented by various diffraction orders. Likewise, the diffracted light will cancel itself out between the orders. Thus, in order to maximize the light that reaches mirror strips $140_1$ or $140_2$, the mirror strips should each be located at one of the diffraction orders for the wavelengths. In the particular example shown in FIG. 4, the mirrors $140_1$ and $140_2$ are located at the −2 order diffraction and the +2 order diffraction, respectively. That is, the light diffracted along paths 160 and 165 represent second order diffraction. More generally, however, the mirror strips $140_2$ and $140_2$ may be located at any appropriate diffraction order.

Figure 5A:
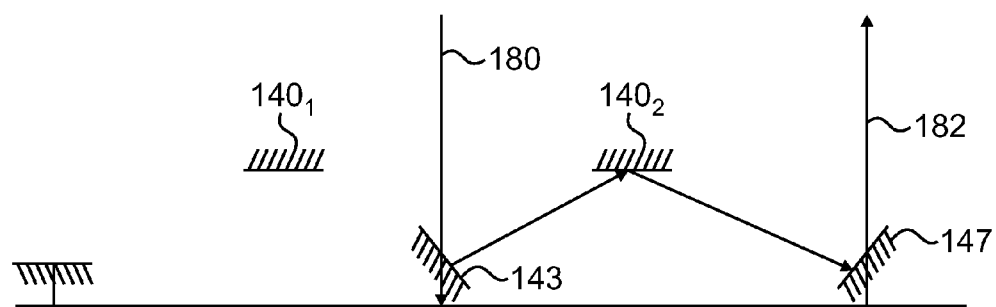
FIGS. 5a and 5b show light paths being reflected off individual mirror elements.

If the light is incident upon mirror strip $140_1$, it will be reflected back to the DMD 130 along path 175. On the other hand, if the light is incident upon mirror strip $140_2$, it will be reflected back to the DMD 130 along path 170. If the mirror elements upon which light beam 170 or 175 is incident are tilted in the opposite position from the mirror elements upon which the initial incoming wavelength $\lambda_1$ is incident along path 180, then the light will be reflected back toward the second collimating lens 125 along paths 180 or 182, which are parallel to path 180. This is illustrated in FIG. 5a, where for simplicity the light path 180 is shown being reflected off a single mirror element 143 and the light path 182 is shown being reflected off a single mirror element 147 in the DMD 130. As shown, mirror elements 143 and 147 are tilted in opposite directions. Note that if the optical beam is incident on more than one mirror of the DMD, it is possible to simultaneously direct different portions of the beam to both outputs 180 and 182. This capability is referred to as programmable multi-casting, which effectively allows a light beam to be split and coupled into multiple output ports.

Referring again to FIG. 4, after traveling along path 180 or 182 after its second reflection off the DMD 130, the light will then traverse the grating 120 and the first collimating lens 115 in a reciprocal manner from that described above. If the light has been reflected off the DMD 130 along path 182, then the light will be received by output port $110_5$. On the other hand, if the light has been reflected off the DMD 130 along path 184, then the light will be received by output port $110_3$. In this way the wavelength $\lambda_1$ can be switched from input port $110_4$ to a selected one of the output ports $110_3$ and $110_5$. The remaining wavelengths $\lambda_1$-$\lambda_N$ can be switched in a similar manner.

Figure 5B:
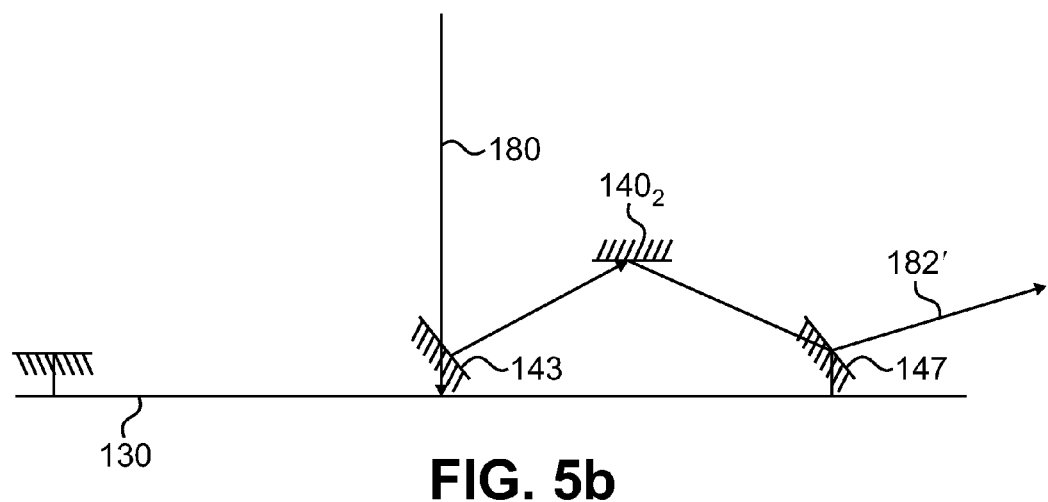

The individual wavelengths may be switched from the input port $110_4$ to one of the output ports $110_3$ and $110_5$ in either a relatively lossless manner or with a controllable amount of attenuation. The attenuation can be imparted by tilting a selected number of the mirror elements upon which the switching wavelength is received from one of the mirror strips $140_1$ and $140_2$. This can be illustrated in connection with FIG. 5b, which shows incoming light path 180 and the outgoing light path 182. As previously noted in connection with FIG. 5a, for simplicity, the light path 180 is shown being reflected off the single mirror element 143 and the light path 182' is shown being reflected off the single mirror element 147. In FIG. 5a the mirror elements 143 and 147 are tilted in opposite directions. In FIG. 5b on the other hand, mirror elements 143 and 147 are both tilted in the same direction and as a result the light is reflected off the mirror element 147 along path 182', where it is directed away from the fiber array 110 and thus is lost. By properly tilting any selected number of the mirror elements that reflect components of the switching wavelength incident upon the DMD 130 a second time, such as in the case of mirror element 147, the light directed to the selected output port or fiber can be attenuated by a selected amount. More specifically, the light can be attenuated in increments equal to the amount of light reflected off a single mirror element. FIG. 5b thus illustrates a general principle of operation of the wavelength selective switch 100. The first set of mirror elements (e.g., mirror elements 143) that the switching wavelength diffracts off of control the output port to which the switching wavelength is directed. The second set of mirror elements (e.g., mirror elements 147) that the switching wavelength diffracts off of control the attenuation of the switching wavelength. Note that if mirror element 147 is positioned in the off or float state, the light path 182 could be reflected onto a subsequent one of the mirror strips 140, which in turn reflects the light back to the DMD 130 from which it could be redirected to one or more additional output ports.

Figure 6:
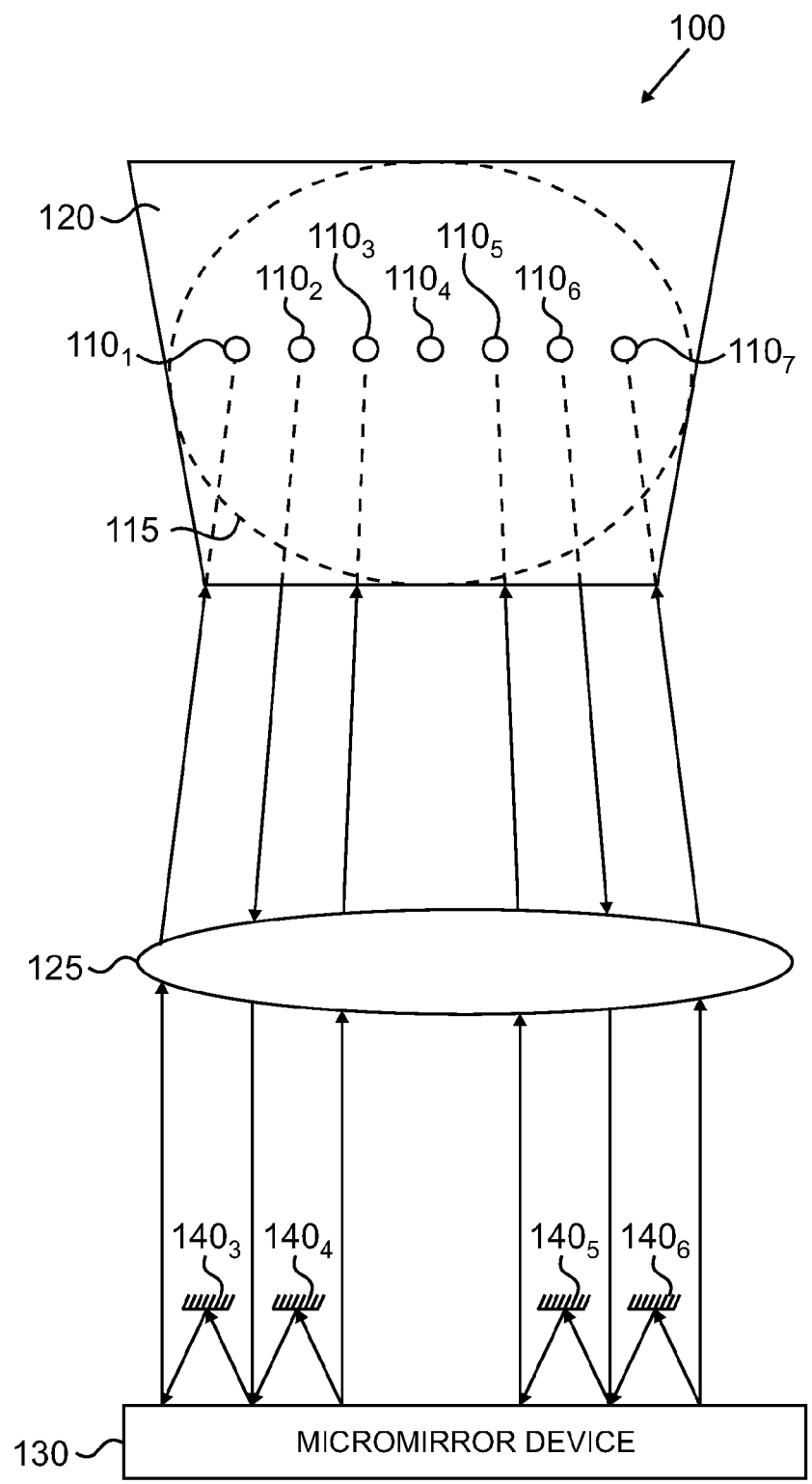
FIG. 6 is a side view of another embodiment of the switch taken along lines 4-4 in FIG. 4.

As described above in connection with input port $110_4$ and output ports $110_3$ and $110_5$, the wavelength selective switch serves as a 1×2 switch. Many other switch configurations are possible using the 1×2 switch as a fundamental building block. For instance, any number of such 1×2 switches may be formed using a single DMD, provided that the appropriate number of mirror strips 140 are employed. In FIG. 4, for example, seven fibers or ports are shown, any three of which can serve as 1×2 switch in which the center port serves as the input ports and the outer ports serve as the output ports. For instance, one switch may be formed by ports $110_1$, $110_2$ and $110_3$, with port $110_2$ serving as the input port, while another switch may be formed by ports $110_5$, $110_6$ and $110_7$, with port $110_6$ serving as the input port. FIG. 6 shows the switch 100 when configured in this manner. Similar to FIG. 4, FIG. 6, as well as FIG. 7 described below, is a side view of the switch 100 taken along lines 4-4 in FIG. 4. In this example the 1×2 switch associated with ports $110_1$, $110_2$ and $110_3$ employs mirror strips $140_3$ and $140_4$ and the 1×2 switch associated with ports $110_5$, $110_6$ and $110_7$ employ mirror strips $140_4$ and $140_5$.

Figure 7:
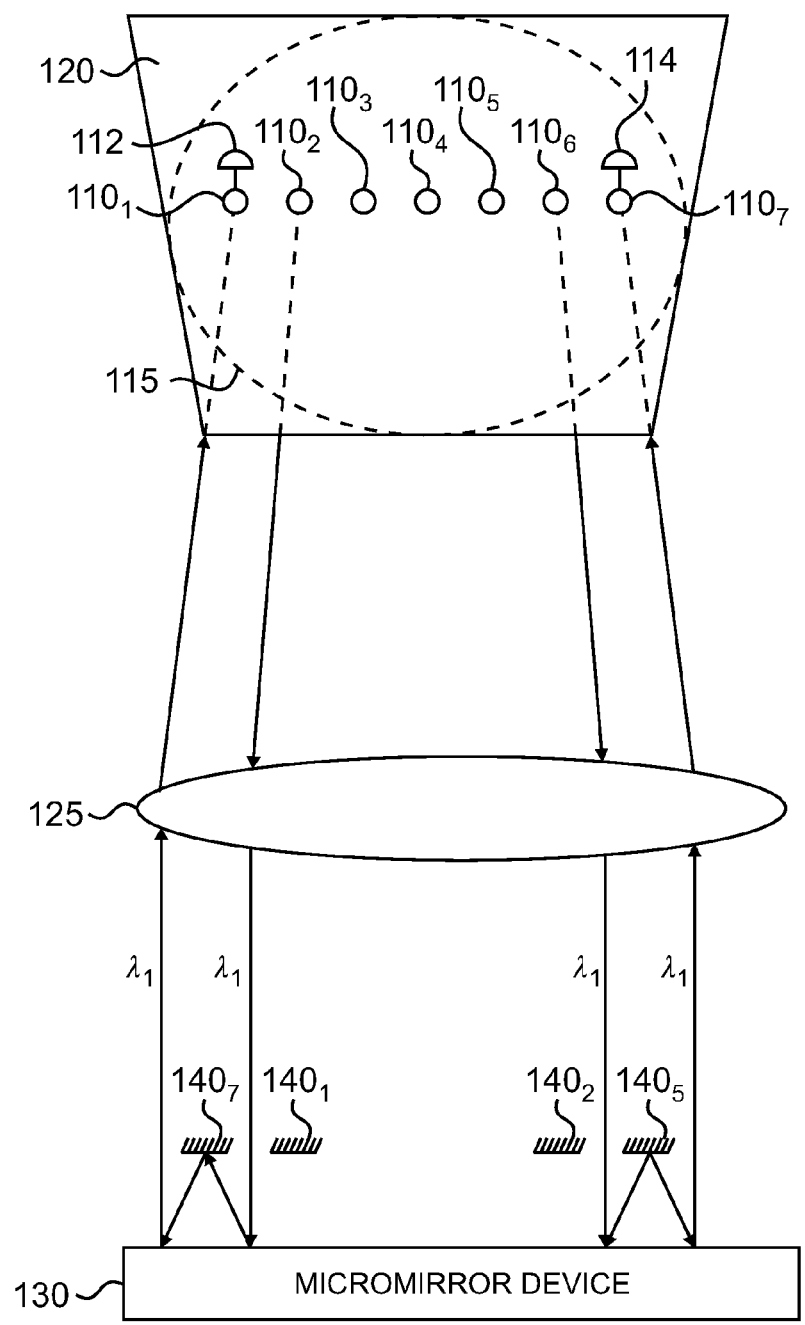
FIG. 7 shows the switch of FIG. 4 configured as a 1×2 switch with an opitical channel monitor (OCM).

The various embodiments of the wavelength selective switch 100 described above may be provided with optical channel monitoring (OCM) capabilities. This can be accomplished using any two adjacent ports, one of which serves as the OCM input and the other of which serves as the output port at which an optical detector can be placed. FIG. 7 shows the switch 100 of FIG. 4 in which ports $110_3$, $110_4$ and $110_5$ serves as a 1×2 switch and ports $110_1$ and $110_2$ serve as one OCM and ports $110_6$ and $110_7$ serve as another OCM. Ports $110_2$ and $110_6$ serve as the OCM inputs and ports $110_1$ and $110_7$ serve as the OCM outputs at which detectors 112 and 114 are located. It should be noted that more generally any two adjacent ports in the wavelength selective switch 100 serve as a 1×1 switch. This switch can be programmably operated as an OCM by using its wavelength selective attenuation capability to raster a narrow band of time varying wavelengths onto the output port detector. This rastering can be calibrated to convert the detector output as a function of time to the optical input power as a function of wavelength.

Although various embodiments are specifically illustrated and described herein, it will be appreciated that modifications and variations of the present invention are covered by the above teachings and are within the purview of the appended claims without departing from the spirit and intended scope of the invention. For example, while the wavelength selective switch as described above employ a fiber array in which the various ports are arranged in parallel with one another, in other embodiments of the invention two or more of the various ports may be arranged to be non-parallel to one another. In this way back reflections into the ports can be avoided when the mirror elements of the DMD are in their off or float state. In addition, while the optical switch has been described as a device that performs switching functionality, the device disclosed herein more generally may be employed for a variety of other purposes instead of, or in addition to, switching. For instance, it has already been mentioned that the device can be used as an optical channel monitor. The device may also be used in applications such as programmable multicasting to direct wavelength components to more than one output port. Another application includes chromatic dispersion control, which can be accomplished by suitably adjusting the path lengths traveled by each of the wavelength components passing through the device.

The invention claimed is:

1. A multiwavelength switch, comprising:
    at least one optical input for receiving an optical beam;
    at least two optical outputs;
    a dispersion element receiving the optical beam from the optical input and spatially separating the optical beam into a plurality of wavelength components;
    a collimating element for collimating the plurality of wavelength components; and
    actuatable optical arrangement receiving the collimated plurality of wavelength components from the collimating element, said actuatable optical arrangement including a digital micromirror device (DMD) from which at least one particular wavelength component is reflected at least once off of a first portion and at least once off a second portion of the DMD before being directed to a selected one of optical outputs, said second portion of the DMD being different from the first portion of the DMD.

2. The multiwavelength switch of claim 1 wherein the DMD receives the collimated plurality of wavelength components, said DMD having an array of individually actuatable mirror elements for selectively reflecting the wavelength components, and wherein the actuatable optical arrangement further includes an optical element for receiving the reflected wavelength components from the DMD and directing them back onto selected ones of the mirror elements of the DMD.

3. The multiwavelength switch of claim 2 wherein the actuatable mirror elements are actuatable in any of three addressable states.

4. The multiwavelength switch of claim 3 wherein the at least two optical outputs comprises at least three output ports.

5. The multiwavelength switch of claim 2 wherein the optical element includes a plurality of planar mirrors having reflective surfaces that face reflective surfaces of the mirror elements of the DMD.

6. The multiwavelength switch of claim 1 wherein the dispersive element is selected from the group consisting of a diffraction grating and a prism.

7. The multiwavelength switch of claim 5 wherein the planar mirrors are positioned to receive a preselected diffractive order of each of the reflected wavelength components of the DMD.

8. The multiwavelength switch of claim 7 wherein the planar mirrors are parallel to a mirror surface of the DMD when its mirror elements are in an off or float state.

9. The multiwavelength switch of claim 5 wherein the plurality of planar mirrors are integrated with the DMD to form a single monolithic assembly.

10. The multiwavelength switch of claim 1 wherein the optical input and optical outputs are parallel to one another.

11. The multiwavelength switch of claim 1 wherein at least two ports selected from among the optical input and the optical outputs are non-parallel to one another.

12. The multiwavelength switch of claim 1 wherein the wavelength component is reflected at least twice before being recombined by the dispersive element.

13. The multiwavelength switch of claim 1 wherein the wavelength component is reflected at least twice before being coupled into the selected one of the outputs.

14. The multiwavelength switch of claim 9 wherein the planar mirrors are defined by a transparent window overlaying the DMD which has spatially varying reflective regions.

15. The multiwavelength switch of claim 2 wherein the wavelength component is reflected from a plurality of mirror elements and the mirror elements are positionable to direct the wavelength component to two or more of the optical outputs.

16. An optical switch, comprising:
    at least one optical input for receiving an optical beam;
    at least three optical outputs;
    a collimating element for collimating the optical beam; and
    an actuatable optical arrangement receiving the collimated beam, said actuatable optical arrangement including a digital micromirrior device (DMD) from which the optical beam is reflected at least once off of a first portion and at least once off a second portion of the DMD before being directed to any selected one or more of the optical outputs, said actuatable optical arrangement having an array of individually actuatable mirror elements selectively positionable in any of three states for reflecting the optical beam, said second portion of the DMD being different from the first portion of the DMD.

17. A method for directing wavelength components of an optical beam from an input port to at least one output port, comprising:
    receiving the optical beam at the input port;
    spatially separating the wavelength components of the optical beam;
    collimating the spatially separated wavelength components;
    directing the collimated wavelength components onto a first portion of a DMD;
    selectively actuating individual mirror elements of the DMD to selectively direct individual ones of the wavelength components to at least one optical element that redirects the individual wavelength components back to a second portion of the DMD different from the first portion;

selectively actuating individual ones of the mirror elements onto which the individual wavelength components have been redirected a second time such that at least some of the individual wavelength components are directed to at least one selected output port.

18. A method for directing wavelength components of an optical beam from an input port to at least one output port, comprising:
receiving the optical beam at the input port;
spatially separating the wavelength components of the optical beam;
collimating the spatially separated wavelength components;
directing the collimated wavelength components onto respective first portions a DMD;
selectively actuating individual mirror elements of the DMD to determine at least one output port to which individual wavelengths are to be independently directed;
directing the individual wavelength components to respective second portions of the DMD different from the respective first portions of the DMD prior to directing them to the at least one output port to selectively attenuate one or more of the individual wavelength components.

19. An optical switching apparatus, comprising:
At least two independently operable optical switches, including:
at least one first optical input and two first optical outputs associated with a first of the optical switches for selectively switching a first optical beam;
at least one second optical input and one second optical output associated with a second of the optical switches for selectively switching a second optical beam;
a dispersive element receiving the first and second optical beams from the first and second optical inputs and spatially separating the first and second optical beams into a first and second plurality of wavelength components, respectively;
a collimating element for collimating the first and second plurality of wavelength components; and
an actuatable optical arrangement receiving the first and second collimated plurality of wavelength components, said actuatable optical arrangement including a micromirror device (DMD) from which the wavelength components of the first and second plurality of wavelength components are each reflected at least once off of a first portion and at least once off a second portion of the DMD before being directed to a selected one of first optical outputs and the second optical output, respectively, said second portion of the DMD being different from the first portion of the DMD.

20. The optical switching apparatus of claim 19 wherein the DMD receives the first and second collimated plurality of wavelength components, said DMD having an array of individually actuatable mirror elements for selectively reflecting the wavelength components, and wherein the actuatable optical arrangement further includes first and second optical elements respectively associated with the first and second optical switches, wherein the first and second optical elements are configured to receive the reflected wavelength components of the first and second plurality of wavelength components, respectively, from the DMD and directing them back onto selected ones of the mirror elements of the DMD.

21. The optical switching apparatus of claim 19 wherein the second optical switch is configured as an optical channel monitor.

22. The optical switching apparatus of claim 19 further comprising at least two second optical output associated with the second of the optical switches.

* * * * *